(No Model.)

S. H. PERCY & D. S. HITCHCOCK.
MEANS FOR ATTACHING WHEELS TO SHAFTS.

No. 496,442. Patented May 2, 1893.

WITNESSES.
Frank Miller.
M. S. Ingham.

INVENTORS.
Sidney H. Percy
David S. Hitchcock
By Wing & Thurston
their attorneys

UNITED STATES PATENT OFFICE.

SIDNEY H. PERCY AND DAVID S. HITCHCOCK, OF CHICAGO, ILLINOIS, ASSIGNORS TO THE SUNOL BICYCLE COMPANY, OF SAME PLACE.

MEANS FOR ATTACHING WHEELS TO SHAFTS.

SPECIFICATION forming part of Letters Patent No. 496,442, dated May 2, 1893.

Application filed October 18, 1892. Serial No. 449,198. (No model.)

*To all whom it may concern:*

Be it known that we, SIDNEY H. PERCY, a subject of the Queen of Great Britain, and DAVID S. HITCHCOCK, a citizen of the United States, residing at Chicago, in the county of Cook and State of Illinois, have invented certain new and useful Improvements in Means for Attaching Wheels to Shafts; and we do hereby declare the following to be a full, clear, and exact description of the invention, such as will enable others skilled in the art to which it appertains to make and use the same.

Our invention relates to the means for securing a sprocket wheel to its shaft, and it is particularly applicable for use in connection with safety bicycles.

The chief object is to provide a suitable construction with which the sprocket wheel may be quickly and accurately secured to its shaft and which will permit its quick removal; and the invention consists in the construction and combination of parts shown and described, as pointed out in the claims.

Figure 1:
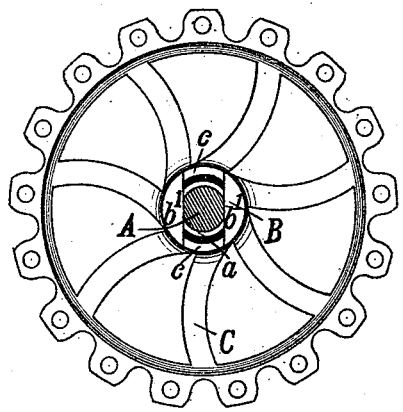
Figure 2:
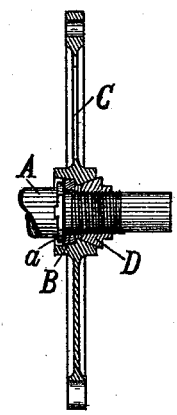
Figure 3:
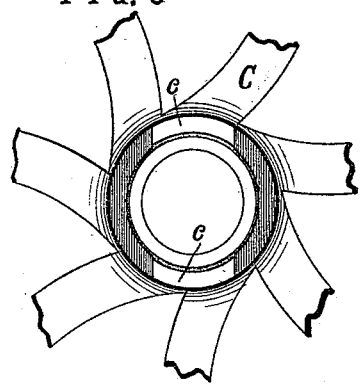
Figure 4:
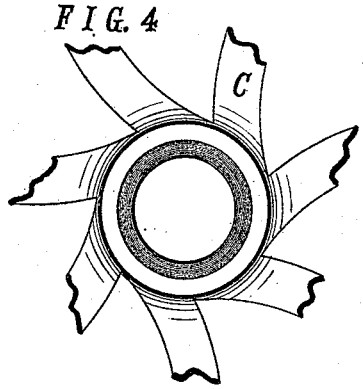
Figure 5:
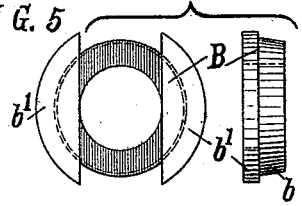
Figure 6:
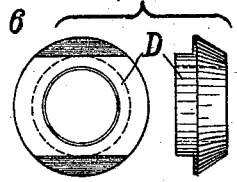
Figure 7:
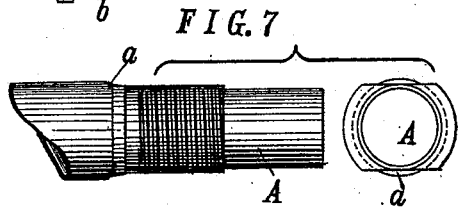

In the drawings, Figure 1 is an elevation of the sprocket wheel shaft (in section) and my improved connecting mechanism, viewed from the left of Fig. 2. Fig. 2 is a central vertical section of the same. Fig. 3 is a view of the rear side of the sprocket wheel hub. Fig. 4 is a view of the front side thereof. Fig. 5 is a rear and side view of the collar B. Fig. 6 is a front and side view of the conical nut; and Fig. 7 is a side and end view of the shaft.

Referring by letter to the several parts, A represents the shaft to which the sprocket wheel is to be secured.

C represents the sprocket wheel which is provided with a tapered bore in the hub thereof.

D represents a conical nut which screws onto the shaft and enters and engages with the tapered bearing in the hub. Means are provided for causing such an interlocking relation between the shaft and sprocket wheel that their relative revolution is prevented; a shoulder or flange *a* is formed on the shaft to limit the longitudinal movement of the sprocket wheel along the shaft. When the nut is screwed up, it engages with the conical bore in the sprocket wheel thereby accurately centering said sprocket wheel on the shaft; and when the sprocket wheel is so centered the interlocking mechanism between the shaft and wheel is effective to compel both to revolve together. For the purpose of producing this interlocking of the sprocket and shaft, any tongue and groove construction may be employed, but we believe the best construction for the purpose is that shown in the drawings in which a removable collar B is employed which is locked both to the shaft and the sprocket wheel. The collar, which is shown in two positions in Fig. 5, has a conical portion *b* and a flange *b'*. The collar is mortised on its back side, thereby dividing the flange as shown. The shaft has a flattened portion *a'* which is slightly beveled, and this flattened portion of the shaft lies in the mortise in the collar, thereby preventing the relative revolution of shaft and collar. The edges of the mortise which engage with the part *a'* of the shaft is correspondingly beveled whereby by pushing the collar along the shaft a close fit between them is produced. Projecting from the sprocket wheel are two wings *c c* which engage between the two parts of the flange *b'*, thereby locking the sprocket wheel and collar together. The bore in the sprocket wheel is tapered from near its center in opposite directions, one tapered portion engaging with the conical part of the collar B and one with the conical nut D. The collar B in addition to its described functions assists in centering the sprocket wheel on the shaft.

The chief advantages which result from the described invention are the ease and rapidity with which a sprocket wheel may be attached to or removed from a shaft; and the exactness with which it may be secured thereto without the necessity of accurately forming the shaft and the bore in the hub to fit each other.

Having thus described our invention, what we claim is—

1. The combination of a shaft, a conical collar B, a conical nut D, a sprocket wheel C having its bore tapered in opposite directions to engage with the collar and nut respectively, and means for preventing the relative revolution of the shaft, collar B and sprocket wheel, substantially as and for the purpose specified.

2. The combination of a shaft having an angular portion, and a collar B which is provided with (1) a conical portion $b$ and (2) a mortised flange $b'$ which engages with said angular part of the shaft, with a sprocket wheel having (1) the wings $c\ c$ which engage with said flange, and (2) a bore which is tapered in opposite directions, and a conical nut D, substantially as and for the purpose specified.

In testimony whereof we affix our signatures in presence of two witnesses.

SIDNEY H. PERCY.
DAVID S. HITCHCOCK.

Witnesses:
P. E. BUEDEFELDT,
LEON B. FELDSHEER.